UNITED STATES PATENT OFFICE.

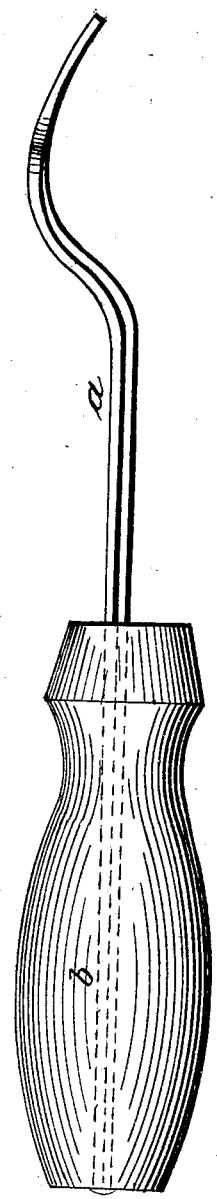

PHILO P. STEWART, OF TROY, NEW YORK.

COVER-LIFTER FOR COOKING-STOVES.

Specification of Letters Patent No. 23,625, dated April 12, 1859.

*To all whom it may concern:*

Be it known that I, PHILO P. STEWART, of the city of Troy, in the county of Rensselaer and State of New York, have invented a new and Improved Lifter for Covers of Cook Stoves and Ranges; and I do hereby declare that the following is a full and exact description of the same, reference being had to the accompanying drawings and to the letters and marks thereon.

Heretofore the lifters for cook-stove and other covers have been made either of cast or wrought iron, generally of the first named iron. If made of cast-iron they have to be made of a weight that renders them clumsy to handle or they will be broken too easily to be serviceable. If made of wrought-iron they can be made lighter and stronger, but the expense incurred in making them of wrought-iron is too great. Whether made of cast or wrought iron the lifter has to meet an objection for the reason that, as it is usually left lying upon some part of the stove, it is always too hot to be comfortably handled. The cast-iron lifter can not have attached to it a handle of some non-conducting material as when made slight enough to be fitted with such handle it would break too readily. And the wrought iron lifter could only have connected to it a non-conducting handle by increasing considerably its cost. A cheap and comfortable lifter is, therefore, very desirable. This is produced by my invention.

The drawings forming part of this specification represent a lifter made up of two distinct materials: that part of it marked (*a*), with its continuation indicated by red lines, being of malleable cast-iron, and that part marked (*b*), and which is the handle, being made of wood or some other good non-conductor. Part (*a*) can be cast of the form and size required at a very small expense. Part (*b*) can be turned out or otherwise rapidly produced also at light cost. A hole bored through the handle (*b*) readily allows the fitting into it of the stem or prolongation of (*a*), and the two parts are securely affixed to each other by one or two blows of a hammer upon the end of the stem, thus riveting the stem to the handle.

This lifter is strong, yet light and very durable, and the handle of it always comfortable to hold even when the lifter is left in the recess of the cover.

Having thus set out the construction and advantages of my invention, what I claim as new and desire to secure by Letters Patent is, The lifter made up of malleable cast-iron and wood as herein set forth.

P. P. STEWART.

Witnesses:
   GEO. A. WELLS,
   J. H. KELLOGG.